United States Patent [19]

Yaegashi et al.

[11] Patent Number: 5,537,278
[45] Date of Patent: Jul. 16, 1996

[54] THIN FILM LAMINATE MAGNETIC HEAD WITH REACTION PREVENTION LAYERS

[75] Inventors: Seiji Yaegashi; Kiyoshi Ogino; Hideo Segawa, all of Toda, Japan

[73] Assignee: Japan Energy Corporation, Tokyo, Japan

[21] Appl. No.: 425,330

[22] Filed: Apr. 17, 1995

Related U.S. Application Data

[63] Continuation of Ser. No. 90,132, filed as PCT/JP92/01554, Nov. 27, 1992, abandoned.

[30] Foreign Application Priority Data

Dec. 2, 1991 [JP] Japan .................... 3-341749

[51] Int. Cl.$^6$ .............................. G11B 5/31; G11B 5/235
[52] U.S. Cl. ...................... 360/126; 360/120; 360/122
[58] Field of Search ..................................... 360/119, 120, 360/121, 122, 125, 126, 127; 427/131, 132; 428/692, 693, 694 R, 701

[56] References Cited

U.S. PATENT DOCUMENTS

| | | | |
|---|---|---|---|
| 4,048,714 | 9/1977 | Huntt | 29/603 |
| 4,532,179 | 7/1985 | Takami et al. | 428/701 X |
| 4,656,547 | 4/1987 | Kumasaka et al. | 360/126 |
| 4,868,698 | 9/1989 | Takahashi et al. | 360/126 |
| 4,953,049 | 8/1990 | Okuda et al. | 360/126 |
| 4,966,820 | 10/1990 | Kojima et al. | 428/701 X |
| 5,034,285 | 7/1991 | Satomi et al. | 428/692 |
| 5,117,321 | 5/1992 | Nakanishi et al. | 360/120 |
| 5,238,507 | 8/1993 | Kugimiya et al. | 148/307 |
| 5,350,628 | 9/1994 | Kugimiya et al. | 428/307.3 |

FOREIGN PATENT DOCUMENTS

| | | |
|---|---|---|
| 60-171610 | 9/1985 | Japan . |
| 62-170008 | 7/1987 | Japan . |
| 3120607 | 5/1991 | Japan . |

*Primary Examiner*—Stewart S. Levy
*Assistant Examiner*—William J. Klimowicz
*Attorney, Agent, or Firm*—Panitch Schwarze Jacob & Nadel

[57] ABSTRACT

A thin film magnetic head comprises a non-magnetic oxide substrate 11 and a soft magnetic thin film 12 of an Fe-Si-Al alloy or the like laminated on the substrate 11. A reaction prevention film 40 of magnesia or an oxide material containing magnesia is formed in the interface between the substrate and soft magnetic thin film. The film 40 has a function of preventing the reaction between the substrate 11 and the thin film 12 to preclude magnetic property deterioration of the soft magnetic thin film and also reproduced output reduction and further preclude increase of the residual stress in the interface between the substrate and soft magnetic thin film, thus permitting excellent magnetic properties to be obtained.

5 Claims, 4 Drawing Sheets

THIN FILM LAMINATE MAGNETIC HEAD WITH REACTION PREVENTION LAYERS

CROSS-REFERENCE TO RELATED APPLICATIONS

This application is a continuation of U.S. patent application Ser. No. 08/090,132, filed Jul. 20, 1993, now abandoned, which is a 371 of PCT/JP92/01554 filed 27 Nov. 1992.

FIELD OF THE INVENTION

This invention relates to a thin film magnetic head produced by laminating a soft magnetic thin film, such as a Fe-Si-Al alloy thin film, on a substrate and, more particularly, to a magnetically excellent thin film magnetic head, which eliminates the mutual dispersion or reaction between an oxide substrate and a magnetic thin film so that it is free from any mutual dispersion layer or reaction layer between the substrate and thin film.

The thin film magnetic head according to the invention is suitably applicable as high frequency, high density recording heads, for which high signal-to-noise ratio is required, mainly thin film magnetic heads with a soft magnetic thin film used as video heads, digital heads, etc.

PRIOR ART STATEMENT

In the field of magnetic recording, recording signal density increase has led to the use of metal type magnetic recording media having high coercive force and residual magnetic flux density. This has dictated that the core material of the magnetic head for magnetic recording or reproduction should have high saturation magnetic flux density and magnetic permeability.

Heretofore, soft magnetic oxide ferrite has been most extensively used as the core material. With this type of ferrite, however, it is difficult to obtain satisfactory characteristics, and recently laminate thin film magnetic heads using a soft magnetic thin film has been gaining rapidly increasing attention. An example of such thin film magnetic head is shown in FIGS. 8 and 9.

Referring to FIG. 9, on a non-magnetic oxide substrate 11 an Fe-Si-Al alloy thin film 12 with a thickness of 3 to 10 μm is formed by means of sputtering. On this soft alloy magnetic thin film 12 is formed a $SiO_2$ type non-magnetic insulating film, i.e., an inter-layer film 13, with a thickness of about 0.1 μm.

The lamination of the soft magnetic thin film 12 and the non-magnetic insulating film 13 are made a required number of times to form a thin film structure 14. The thicknesses and the number of times of lamination of the soft magnetic thin film 12 and non-magnetic insulating film 13, are suitably set such as to obtain a laminate thickness corresponding to track width W.

Subsequently, on the laminate structure 14 a glass film 15 is formed, on which is then a different substrate is laminated. The substrate 16 is of the same or like material as that of the substrate 11.

The magnetic laminate 17 thus obtained is sliced in its thickness direction for producing a pair of coreblock halves 18 and 19 as shown in FIG. 8. At least one of the core halves, in this example the core half 18, is formed with a wiring groove 20.

For reinforcing the bond between the mating faces of the core block halves 18 and 19, in this example the opposite sides of the core block half 19 are formed with chamfers 22 facing the wiring groove 20, as shown in FIG. 8, while also forming a recess 23 in the two core halves on the side thereof opposite the magnetic gap. The mating faces of the core block halves 18 and 19 are polished, and between them is formed a non-magnetic gap spacer 21 of $SiO_2$.

The mating faces of the core block halves 18 and 19 are bonded together while filling the chamfers and recess with molding glass.

Subsequently, R (radius) polishing is applied for tape slide face formation, other molding processes and a wiring process are carried out, thus obtaining a thin film magnetic head 10.

As is seen from the above description, in the above thin film magnetic head 10 the track width W may be obtained by forming the thin film structure 14 having a thickness corresponding to the track width on the substrate 11 by means of sputtering. That is, extra processes for providing the track width W which are required in the prior art can be dispensed with, thus solving prior art problems which have been presented when manufacturing a magnetic head by using a core block of ferrite or like material.

However, in the above laminate thin film magnetic head 10 as the non-magnetic oxide substrates 11 and 16 are extensively used with glass substrate of $SiO_2$-$Li_2O$-$Al_2O$ type crystal glass or the like, $SiO_2$ type oxide substrates, $Al_2O_3$ type oxide substrates, Mn-Ni-O type oxide substrates, Co-Ni-O type oxide substrates, etc. On the other hand, the soft magnetic thin film 12 like a Fe-Si-Al alloy thin film is usually deposited on the non-magnetic oxide substrate 11 by vacuum thin film techniques such as sputtering as noted above, ion plating, vacuum deposition, etc.

As noted above, the non-magnetic gap spacer 21 of $SiO_2$ is formed between the mating faces of the core block halves 18 and 19. To this end, the mating faces are fusion treated. Experiments conducted by the inventors revealed that because the interface between the non-magnetic oxide substrate 11 and the soft magnetic thin film 12 is elevated to as high temperature as 300° to 700° C. in the fusion treatment, reaction is caused between the oxide in the non-magnetic oxide substrate 11 and Fe, Al or Si atoms as the constituent element of the soft magnetic thin film 12 of an Fe-Si-Al alloy or the like, thus forming an oxide or oxides. This means that a surface portion of the substrate 11 adjacent the interface noted above is reduced, and a reaction layer 50 is formed. The reaction layer 50 usually has a thickness t of 0.1 to 2 μm.

The reaction layer 50 is composed of a corresponding part of the Fe-Si-Al alloy thin film with Al and Si made scanty, oxide or oxides of Si and an oxide or oxides of Al, and further such metals as Co and Ni in the case where the non-magnetic oxide substrate 11 is a Co-Ni-O type oxide substrate. Thus, it poses the problems of deteriorating the magnetic properties of the soft magnetic thin film 12 and reducing the reproduction output.

Further, the soft magnetic thin film 12 of an Fe-Si-Al alloy or the like has a coefficient of thermal expansion of $130 \times 10^{-7}$ to $160 \times 10^{-7}$/°C. If there is formed as the reaction layer 50 a material having a lower coefficient of thermal expansion than that noted above, the residual stress in the interface between the soft magnetic thin film 12 and the substrate 11 is increased to have adverse effects on the magnetic characteristics.

DISCLOSURE OF THE INVENTION

An object of the invention is to provide a magnetically excellent thin film magnetic head using a soft magnetic thin film of an Fe-Si-Al alloy or the like, which is free from the formation of any mutual dispersion layer or reaction layer in the interface between the soft magnetic thin film and the non-magnetic oxide substrate, thus precluding magnetic property deterioration of the soft magnetic thin film and also reproduced output reduction and further precluding increase of the residual stress in the interface between the soft magnetic thin film and the substrate.

In summary, the invention features a thin film magnetic head, which comprises a non-magnetic oxide substrate and a soft magnetic film laminated thereon, a reaction prevention film of magnesia (MgO) or an oxide material containing mangesia (MgO) being formed in the interface between the non-magnetic oxide substrate and the soft magnetic thin film. The oxide material containing magnesia (MgO) may, for instance, be a composite oxide comprising $MgTiO_3$, $MgO \cdot Al_2O_3$ and the like, or a mixture oxide obtained by adding to MgO at least one member of the group consisting of $TiO_2$, $Al_2O_3$, $SiO_2$, NiO, CoO, MnO and $ZrO_2$.

The reaction prevention film suitably has a thickness of 10 to 5,000Å, preferably 50 to 1,000Å.

The non-magnetic oxide substrate is either a glass sub state, a $SiO_2$ type oxide substrate, an $Al_2O_8$ type oxide substrate, a Mn-Ni-O type oxide substrate or a Co-Ni-O type oxide substrate. The soft magnetic thin film is made of either an Fe-Si-Al alloy, an amorphous magnetic material, iron nitrate, or an Fe-Me-N or Fe-Me-C alloy (where Me represents at least one member of the group consisting of Ta, Zr, Hf, Ti, B, Si, Al, Mn, Cr, Mo, V and W).

BEST-MODE OF CARRYING OUT THE INVENTION

Now, the thin film magnetic head according to the invention will be described in more detail with reference to the drawings.

Figure 1:
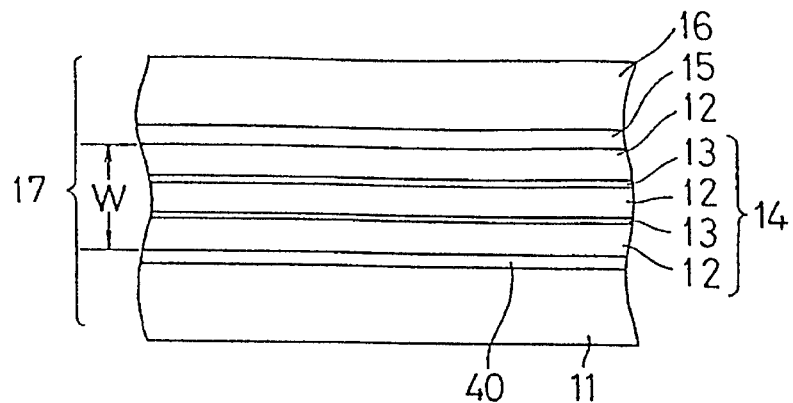
FIG. 1 is a pictorial fragmentary sectional view showing a magnetic laminate in a thin film magnetic head embodying the invention.
Figure 2:
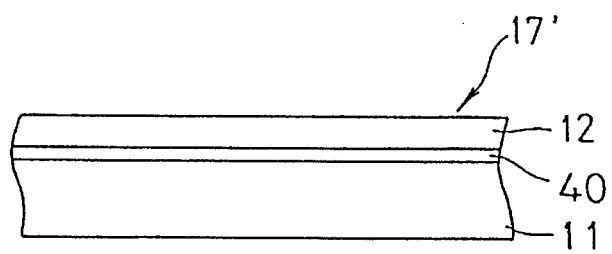
FIG. 2 is a pictorial fragmentary sectional view showing a magnetic thin film laminate structure in the embodiment of the invention.
Figure 8:
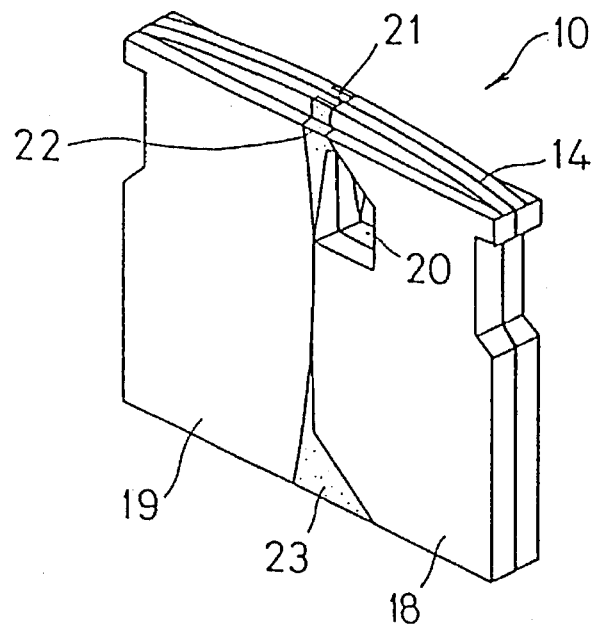
FIG. 8 is a perspective view showing a thin film magnetic head.
Figure 9:
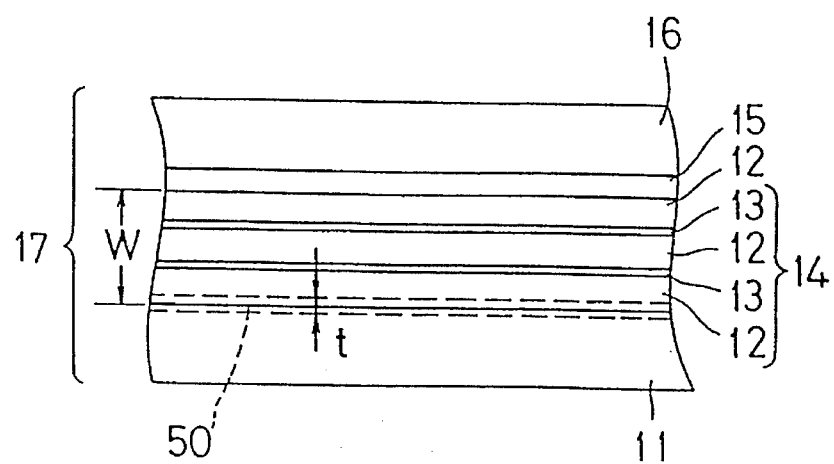
FIG. 9 is a pictorial fragmentary sectional view showing a magnetic laminate in a prior art thin film magnetic head.

FIG. 1 shows a magnetic laminate 17 for the thin film magnetic head according to the invention. The thin film magnetic head according to the invention has substantially the same mechanical structure as shown in FIGS. 8 and 9. However, the structure according to the invention is greatly set apart from that in the prior art in that a reaction prevention film 40 is formed between a non-magnetic oxide substrate 11 and a soft magnetic thin film 12 laminated thereon. In the magnetic laminate 17 for the thin film magnetic head according to the invention shown in FIG. 1, parts like those in the prior art magnetic laminate shown in FIG. 9 are designated by like reference numerals.

The reaction prevention film 40 according to the invention, is formed in the interface between the non-magnetic oxide substrate 11 and the soft magnetic thin film 12 and has a function of preventing reaction between the substrate and the thin film. It is made of magnesia (MgO) or an oxide material containing magnesia (MgO). These materials can ensure thermodynamically stable state of oxides. Thus, they cause less mutual dispersion or reaction between the non-magnetic oxide substrate 11 and the soft magnetic thin film 12 of an Fe-Si-Al alloy or the like. In addition, their coefficient of thermal expansion is as high as about $130 \times 10^{-7}/°C$. Thus, they do not increase stress in their interface with the soft magnetic thin film 12, and thus are best suited for the reaction prevention film 40.

Examples of the oxide material containing magnesia (Mg O) are such composite oxides as $MgTiO_3$ and $MgO \cdot Al_2O_3$ and also such mixture oxides as those obtainable by adding, to MgO, at least one member of the group consisting of $TiO_2$, $Al_2O_3$, $SiO_2$, NiO, CoO, MnO and $ZrO_2$.

The reaction prevention film 40 has a thickness of 10 to 5,000 Å, preferably 50 to 1,000 Å. If the thickness is less than 10 Å, it is difficult to obtain continuous attachment of the film. On the other hand, a thickness in excess of 5,000 Å is unnecessary. The reaction prevention film 40 may be formed on the non-magnetic oxide substrate 11 by means of vacuum thin film techniques such as sputtering, ion plating, vacuum deposition or the like.

As the non-magnetic oxide substrate 11 for the thin film magnetic head according to the invention may be used heretofore employed substrates having satisfactory thermal stability and thermal expansion coefficient. Examples of such substrate are glass substrates, for instance of $SiO_2$-$Li_2O$-$Al_2O$, type crystal glass, $SiO_2$ type oxide substrates, $Al_2O_2$ type oxide substrates, Mn-Ni-O type oxide substrates and Co-Ni-O type oxide substrates.

As the soft magnetic thin film 12 for the thin film magnetic head according to the invention may be used various soft magnetic thin films, for instance those of Fe-Si-Al alloys, amorphous magnetic materials and iron nitride. Preferred are Fe-Si-Al alloy soft magnetic thin films, which have zero magnetostriction and very low magnetic anisotropy, thus permitting high magnetic permeability and low coercive force to be obtained.

Further, it is possible to use Fe-Me-N or Fe-Me-C alloy soft magnetic thin films, where Me represents Ta, Zr, Hf, Ti, B, Si Al, Mn, Cr, Mo, V, W, etc.

The thin film structure 14 noted above may comprise only a single soft magnetic thin film as the film 12. In this case, the thin film has a thickness of 1 to 10 μm. Where the thin film structure 14 has a multiple layer structure having two to five soft magnetic thin films 12 as shown in FIG. 1, the thickness W of the thin film structure 14 is set to 2 to 100 μm inclusive of one or more non-magnetic insulating layers, i.e., inter-layer films 13, each with a thickness of about 0.1 μm.

Now, examples of the thin film magnetic head according to the invention will be described.

EXAMPLES 1 AND 2; COMPARATIVE EXAMPLES 1 AND 2

In each of these Examples, a magnetic thin film laminate structure 17' including only a single soft magnetic thin film 12 was produced.

As the non-magnetic oxide substrate 11, a Co-Ni-O type oxide substrate represented as $(CoO)_x(NiO)_{1-x}$ (where x=0.55) and having a diameter of 2 inches was used after polishing it to a surface roughness of 150 Å.

First, on the non-magnetic oxide substrate 11 a reaction prevention film 40 was formed to a thickness of 1000 Å by using a RF magnetron sputtering apparatus together with a magnesia (MgO) target having a diameter of 4 inches and a thickness of 5 mm. The distance between the target and the substrate 11 was set to 45 mm, the Ar pressure to $4 \times 10^{-8}$ Torr, and the input power to 300 W. The substrate temperature was 200° C., and the film formation rate was 0.003 μm/min.

Subsequently, an Fe-Si-Al alloy soft magnetic film 12 was formed on the reaction prevention film 40 on the substrate 11 by using a DC sputtering apparatus together with a target composed of 83 to 94% by weight of Fe, 4 to 11% by weight of Si and 2 to 6% by weight of Al and having a diameter of 4 inches and a thickness of 4 mm. The distance between the target and the substrate 11 was set to 45 mm, the Ar pressure to $4 \times 10^{-3}$ Torr, and the input power to 500 W. The substrate temperature was 60° C., and the film formation rate was 0.4 μm/min.

The thickness of the soft magnetic thin film was set to 0.2 μm (in Example 1) and to 5 μm (in Example 2).

Magnetic thin film laminate structures of Comparative Examples were produced with the same materials and in the same way as in Examples 1 and 2 except that the reaction prevention film 40 was not formed and that the thickness of the soft magnetic thin film 12 was set to 0.2 μm (in Comparative Example 1) and to 5 μm (in Comparative Example 2).

Figure 6:
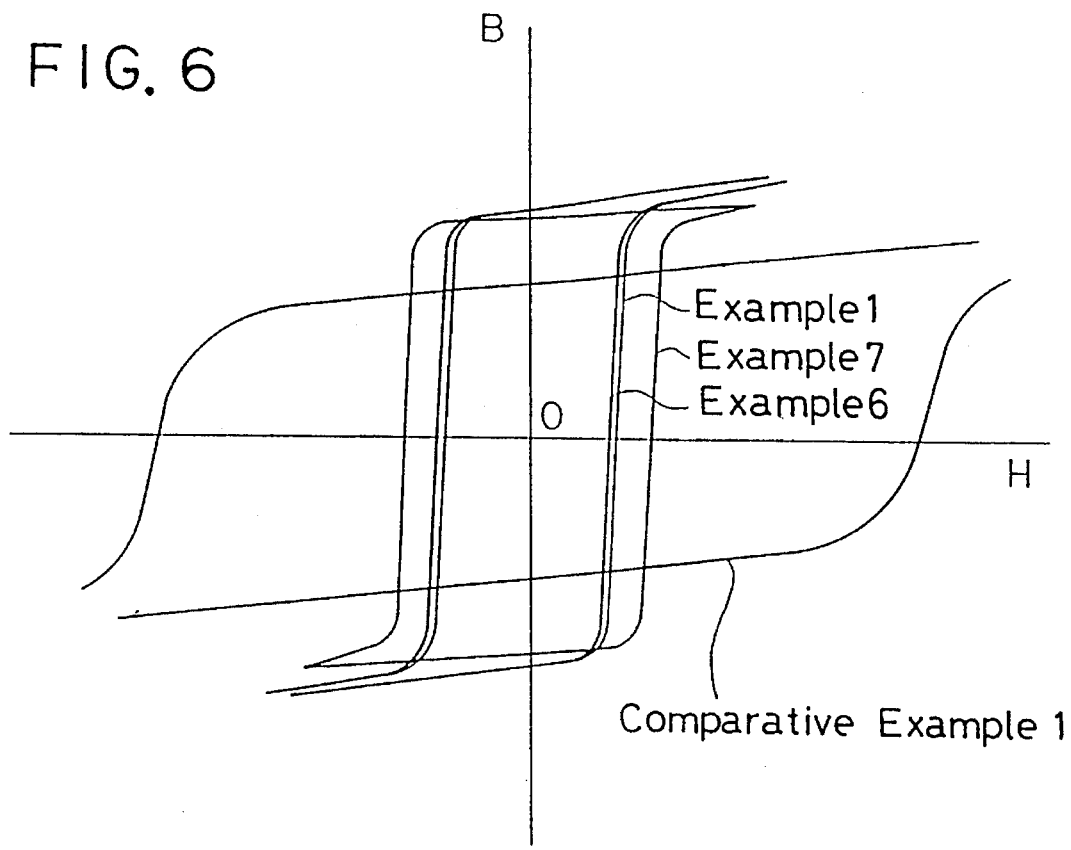
FIG. 6 is a graph showing the B-H characteristics of thin film magnetic heads according to the invention and in the pior art.

The samples in the Examples 1 and 2 and Comparative Examples 1 and 2 were then heat treated in high vacuum (of about $10^{-6}$ Torr) and at 700° C. for one hour, and then their magnetic property (i.e., coercive force Hc) was measured. Table 1 shows the results of the measurements. FIG. 6 shows the B-H characteristics.

The coercive force Hc was measured with a vibrated sample type magnetic force meter.

TABLE 1

| | Thickness (μm) of laminate structure | Reaction prevention layer 40 | Coercive force (Hc) |
| --- | --- | --- | --- |
| Ex. 1 | 0.2 | Present | 5 to 6 |
| C. Ex. 1 | 0.2 | Absent | 24 |
| Ex. 2 | 5 | Present | 0.50 to 0.60 |
| C. Ex. 2 | 5 | Absent | 0.55 to 0.80 |

It will be seen from Table 1 and FIG. 6 that the magnetic thin film laminate structures according to the invention are superior to those without the reaction prevention layer 40 in the prior art in the magnetic property (i.e., coercive force) when they are used for magnetic head irrespective of their thickness.

EXAMPLES 3 TO 7

There was examined the relation between the substrate temperature when forming the reaction prevention film 40 by sputtering in accordance with the invention and the temperature of the heat treatment temperature after the formation of the reaction prevention film.

The heat treatment was carried out with the same materials and in the same way as in the above Examples 1 and 2 except that the substrate temperature was set to room temperature, 300° C. and −700° C. and that the heat treatment after the reaction prevention film formation was not done, done at 500° C. and done at 700° C., before forming a soft magnetic thin film having a thickness of 0.2 μm.

Figure 7:
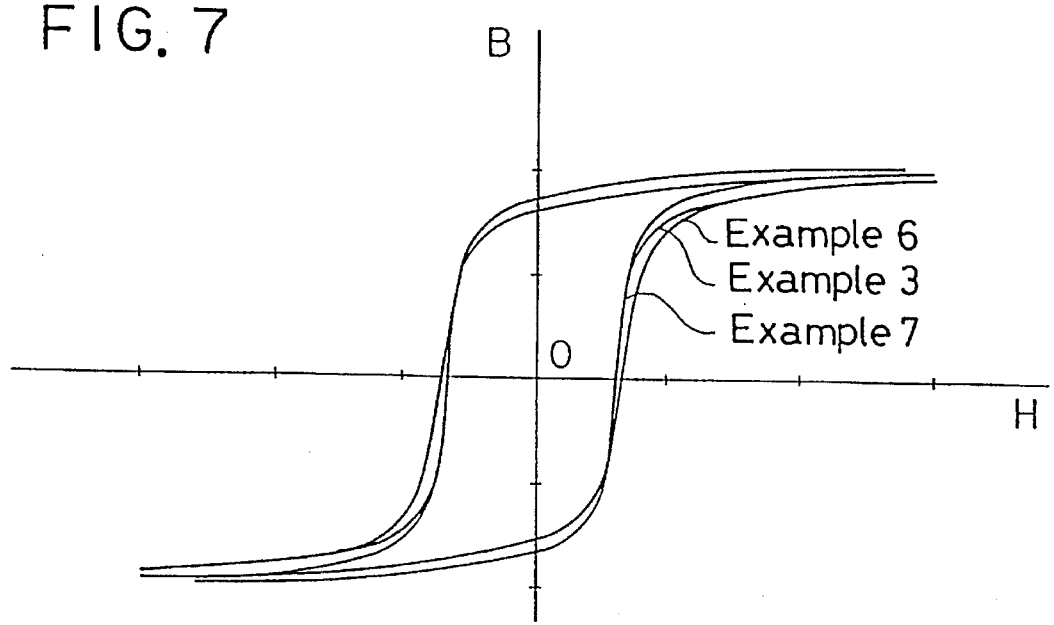
FIG. 7 is a graph showing B-H characteristics for reviewing the thermal treatment effect of reaction prevention layers formed according to the invention.

Then, all the samples were heat treated in high vacuum (of about $10^{-6}$ Torr) and at 700° C. for one hour, and the magnetic property (i.e., coercive force Hc) was measured. Table 2 shows the results. The coercive force Hc was measured with a vibrated sample type magnetic force mater. FIG. 7 shows B-H characteristics.

TABLE 2

| | Substrate temp. | Surface treatment temp. (°C.) | Coercive force (Hc) |
| --- | --- | --- | --- |
| Ex. 3 | Room temp. | — | 5.5 |
| Ex. 4 | 300° C. | — | 5.2 |
| Ex. 5 | 700° C. | — | 7.9 |
| Ex. 6 | Room temp. | 500° C. | 5.5 |
| Ex. 7 | Room temp. | 700° C. | 5.1 |

As is seen from Table 2 and FIG. 7, with the substrate temperature of 700° C. when forming the reaction prevention layer 40 by sputtering, the coercive force is increased slight but not substantially. In addition, it was found that the heat treatment after the reaction prevention film formation is not so important.

EXAMPLE 8

In this example, a thin film magnetic head having the structure as shown in FIG. 8, having only a single soft magnetic thin film 12, was produced by using the magnetic laminate structure 17 shown in FIG. 1.

As the non-magnetic oxide substrate 11, a Co-Ni-O type oxide substrate represented as $(CoO)_x(NiO)_{1-x}$ (where x=0.55) and having a diameter of 2 inches was used after polishing it to a surface roughness of 150 Å.

First, on the non-magnetic oxide substrate 11 a reaction prevention film 40 was formed to a thickness of 1000 Å by using a RF magnetron sputtering apparatus together with a magnesia (MgO) target having a diameter of 4 inches and a thickness of 5 mm. The distance between the target and the substrate 11 was set to 45 mm, the Ar preessure to $4 \times 10^{-3}$ Torr, and the input power to 300 W. The substrate temperature was 200° C., and the film formation rate was 0.003 μm/min.

Subsequently, an Fe-Si-Al alloy soft magnetic film 12 was formed on the reaction prevention film 40 on the substrate 11 by using a DC sputtering apparatus together with a target composed of 83 to 94% by weight of Fe, 4 to 11% by weight of Si and 2 to 6% by weight of Al and having a diameter of 4 inches and a thickness of 4 mm. The distance between the target and the substrate 11 was set to 45 mm, the Ar pressure to $4 \times 10^{-3}$ Torr, and the input power to 500 W. The substrate temperature was 60° C., and the film formation rate was 0.4 μm/min.

The thickness of the soft magnetic thin film 12 was set to 5 μm for producing the magnetic head, while it was set to 0.2 μm for the analysis in the depth direction according to the Auger's spectroscopic analysis method.

Subsequently, heat treatment was carried out in high vacuum (of about $10^{-6}$ Torr) and at 700° C. for one hour. Then, the Auger's spectroscopic analysis was made on the sample for the analysis.

With the sample for the magnetic head, on the other hand, a glass film 15 was formed on the soft magnetic thin film structure 14. For the glass film 15 was used one composed of 50% by weight of $SiO_2$, 20% by weight of $Na_2O$ and 10% by weight of $Al_2O_3$, the remainder being BaO, $K_2O$, CaO, etc. The glass film 15 was formed by using the RF magnetron sputtering apparatus noted above. The Ar pressure was set to $6\times10^{-3}$ Torr, the input power to 100 W, and the substrate temperature to 100° C. Under the above conditions, the glass film 15 was formed to a thickness of 1 μm.

Then, the other substrate 16 of the same material as the substrate 11 was laminated on the glass film 15, thus obtaining the magnetic laminate structure 17. Then, fusion press bonding of the magnetic laminate structure 17 was done at 650° C. for 15 minutes.

Subsequently, the magnetic laminate structure 17 thus produced was sliced in its thickness direction to obtain the pair core block halves 18 and 19 as shown in FIG. 8, and the core block half 18 is formed with the wiring groove 20. Then, to reinforce the bond between the mating faces of the two core block halves 18 and 19, the opposite sides of the core block half 19 were formed with chamfers adjacent to the wiring groove 20, as shown in FIG. 8, while also forming a recess in both the core block halves on the side thereof opposite the gap. The mating faces of the two core block halves 18 and 19 were polished, and then the magnetic gap spacer of $SiO_2$ was formed by sputtering. Then, the chamfers and recess were filled with molding glass by fusion thereof.

Finally, R polishing for the tape slide surface formation, other molding processes and wiring were carried out, thus obtaining the thin film laminate magnetic head as shown in FIG. 8.

COMPARATIVE EXAMPLE 3

A thin film magnetic head without the reaction prevention film was produced with the same materials and in the same way as in Example 8.

EXAMPLE 9

Figure 3:
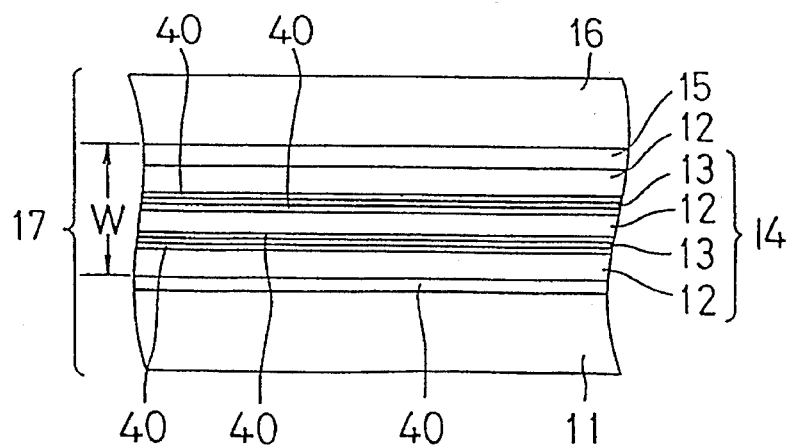
FIG. 3 is a pictorial fragmentary sectional view a different example of the mangetic laminate in the thin film magnetic head according to the invention.

In this example, a thin film magnetic head 10 was produced by using the magnetic laminate structure 17 as shown in FIG. 3, having a plurality of soft magnetic thin films 12 like the structure shown in FIG. 1. In this example, four soft magnetic thin films 12 were formed.

In this example, the reaction prevention film 40 was provided not only between the non-magnetic oxide substrate 11 and the adjacent soft magnetic thin film 12 but also between each soft magnetic thin film 12 and each inter-layer film 13.

First, on the substrate 11 a reaction prevention film 40 and a Fe-Si-Al alloy soft magnetic thin film 12 were formed to a thickness of 5.25 μm with the same materials and in the same way as in Example 8.

Then, another reaction prevention film 40 was formed on the Fe-Si-Al alloy film 12. It is formed in the manner as described before, that is, by using a RF magnetron sputtering apparatus together with a magnesia (MgO) target having a diameter of 4 inches and a thickness of 5 mm and by setting the distance between the target and the Fe-Si-Al alloy film 12 to 45 mm, the Ar pressure to $4\times10^{-3}$ Torr and the input power to 300 W. It was formed to a thickness of 300 Å. The substrate temperature was 200° C., and the film formation rate was 0.003 μm/min.

Subsequently, an inter-layer film 13 was formed on this reaction prevention film 40. It was formed by using the same RF magnetron sputtering apparatus as that used for the reaction prevention film formation together with a $SiO_2$ target having a diameter of 4 inches and a thickness of 5 mm. The Ar pressure was set to $6\times10^{-3}$ Torr, the input power was set to 300 W, and the substrate temperature was set to 100° C. Under these conditions, a $SiO_2$ film was formed as the film 13 to a thickness of 0.1 μm.

Subsequently, a further reaction prevention film 40 was formed on the $SiO_2$ inter-layer film 13 in the manner as described before. Then, another soft magnetic thin film 12 is formed on the film 40. The above sequence of operations was repeated four times in total with the reaction prevention film 40 formed between each soft magnetic thin film 12 and the inter-layer film 13, that is, a soft magnetic thin film structure 14 was obtained, which had four soft magnetic thin films 12, and in which the reaction prevention film 40 was formed between each soft magnetic thin film 12 and the inter-layer film 13. The soft magnetic thin film structure 14 had a whole thickness of 21.5 μm. Subsequently, heat treatment was carried out in high vacuum (of about $10^{-6}$ Torr) and at 700° C. for one hour.

On the soft magnetic thin film structure 14 thus obtained a glass film 15 was formed. For the glass film was used glass composed of 50% by weight of $SiO_2$, 20% by weight of $Na_2O$ and 10% by weight of $Al_2O_3$, the remainder being BaO, $K_2O$, CaO, etc. The glass film 15 was formed by using the RF magnetron sputtering apparatus noted above and setting the Ar pressure to $6\times10^{-3}$ Torr, the input power to 100 W and the substrate temperature to 100° C. Under these conditions, the glass film 15 was formed to a thickness of 1 μm.

Subsequently, the other substrate 16 of the same material as the substrate 11 was laminated on the glass film 15, thus obtaining the magnetic laminate structure 17. The magnetic laminate structure 17 thus obtained was subjected to a fusion press treatment at 650° C. for 15 minutes.

Thereafter, the magnetic laminate structure 17 was sliced in the thickness direction to obtain a pair of core block halves 18 and 19 as shown in FIG. 8. The core block half 18 was then formed with a wiring groove 20. Then, for reinforcing the bond between the mating faces of the core block halves 18 and 19, the opposite sides of the core block half 19 are formed with chamfers adjacent the wiring groove 20 as shown in FIG. 8, and a recess is formed in the core block halves on the side thereof opposite the gap. The mating faces of the core block halves 18 and 19 are polished, and a non-magnetic gap spacer 21 of $SiO_2$ was formed by sputtering. The chamfers and recess were then filled with molding glass by fusion.

Finally, R polishing for the tape side surface formation, other molding processes and wiring were carried out to obtain the thin film laminate magnetic head 10 shown in FIG. 8.

CONSIDERATIONS OF EXAMPLES 8 AND 9 AND COMPARATIVE EXAMPLE 3

Figure 4:
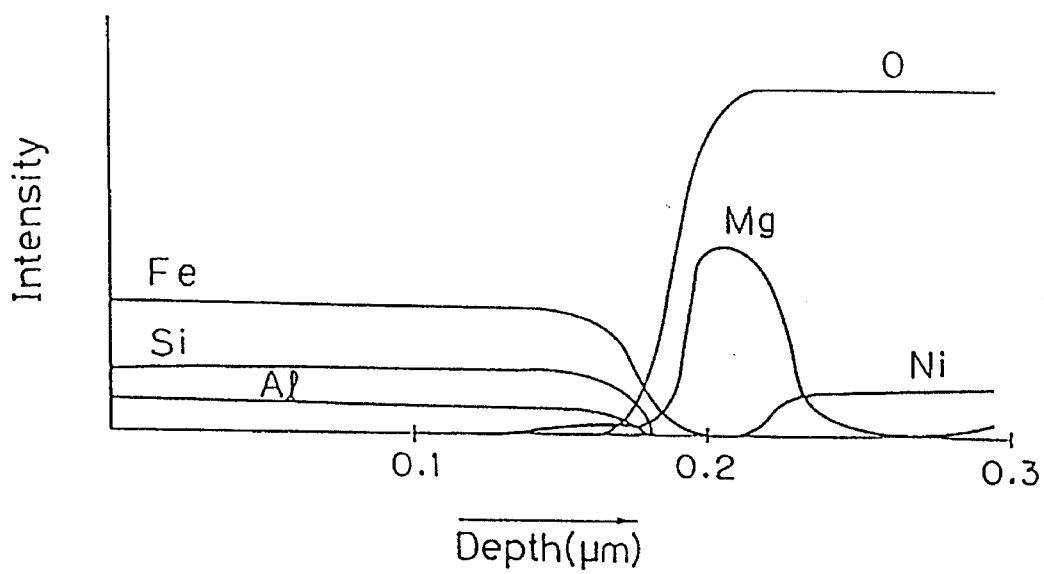
FIG. 4 is a graph showing the results of element analysis in the depth direction of a soft magnetic thin film formed according to the invention.
Figure 5:
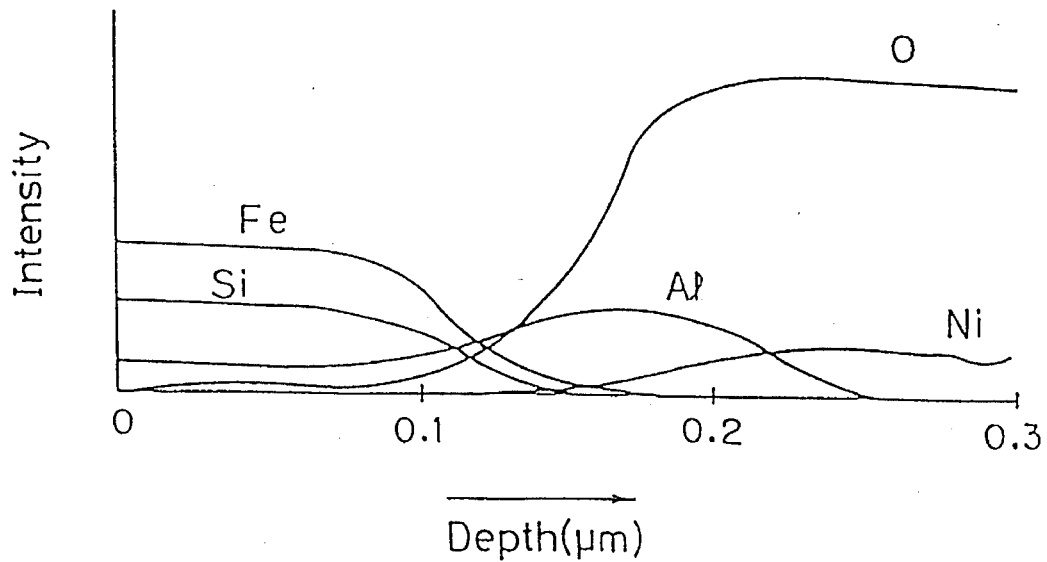
FIG. 5 is a graph showing the results of element analysis in the depth direction of a prior art soft magnetic thin film.

FIG. 4 shows the results of element analysis with respect to Fe, Al, Si, Mg, Ni and O in the depth direction by the Auger's spectroscopic analysis when the MgO reaction prevention film 40 was provided (Example 8), while FIG. 5 shows the results of element analysis in the absence of the reaction prevention film 40 (Comparative Example 3). Although not shown, element analysis results with respect to Fe, Al, Si, Mg, Ni and O in the depth direction by the Auger's spectroscopic analysis of the magnetic laminate structure in Example 9, were like those shown in FIG. 4.

As is seen from FIGS. 4 and 5, in the absence of the reaction prevention film 40 the element distribution slopes in the interface between the soft magnetic thin film 12 and non-magetic oxide substrate 11 are not so sharp, indicating pronounced dispersion of oxygen in the soft magnetic thin film 12. Another feature is that the Al concentration is high in the vicinity of the interface. The element ratio between Al and O was calculated and found to be 2:3, indicating that $Al_2O_3$ was formed. The reaction layer 50 substantially has a thickness of 0.1 μm.

Where the MgO reaction prevention film 40 was provided, on the other hand, it was found that the dispersion of elements was reduced and that sharper element distribution slopes resulted in the interface between the substrate 11 and the reaction prevention film 40 and also in the interface between the reaction prevention film 40 and the soft magnetic thin film 12.

While the above examples concerned with the case of using MgO as the reaction prevention film 40, it was found that in the case of using oxide materials containing MgO, like the case of the sole MgO, the dispersion of elements was reduced, and sharper element distribution slopes resulted in the interface between the substrate 11 and the reaction prevention film 40 and also in the interface between the reaction prevention film 40 and the soft magnetic thin film 12.

Further, with the thin film magnetic heads produced in Examples 8 and 9 the surface state was observed with SEM. It was found that with the magnetic heads with the reaction prevention film or films 40 no metal layer precipitation could be observed, and the interface was smooth and free from any disturbance that might result in the case of absence of the reaction prevention film.

Further, the soft magnetic thin films in Examples 8 and 9 according to the invention have very satisfactory magnetic properties in the state of the magnetic laminate structure, providing a coercive force of 0.5 Oe and an initial specific magnetic permeability of about 2,000 at 1 MHz. Further, 50 magnetic heads were produced in each of Examples 8 and 9 and Comparative Example 3, and their reproduction output was measured in their use as VTR magnetic head with the track width in the thickness direction. Their track width was set to 5 and 21.5 μm, and the tape head relative speed was set to 5.8 m/sec, and they were used with a metal tape. It was found that the magnetic heads according to the invention were superior to those in the contast example in the reproduction output at 5 MHz.

POSSIBILITY OF THE INDUSTRIAL UTILIZATION

As has been described in the foregoing, in the thin film magnetic head according to the invention a reaction prevention film of magnesia or an oxide material containing magnesia is provided in the interface between a non-magnetic oxide substrate and a soft magnetic thin film. Thus, it is possible to prevent dispersion of oxygen in the soft magnetic thin film so as to prevent formation of any reaction layer in the interface between the thin film and the substrate, thus precluding magnetic property deterioration of the soft magnetic thin film and also reduction of the reproduction output and further preventing increase of the residual stress in the interface between the thin film and the substrate. It is thus possible to ensure excellent magnetic characteristics.

Thus the thin film magnetic head according to the invention can be suitably utilized as high density recording heads for high frequency purposes and required to have high signal-to-noise ratio, particularly thin film magnetic heads used as video heads and digital heads.

What is claimed is:

1. A thin film magnetic head comprising a non-magnetic oxide substrate made of an oxide selected from the group consisting of Mn-Ni-O and Co-Ni-O, a plurality of Fe-Si-Al alloy thin films laminated on said substrate, and non-magnetic insulating films each intervening between adjacent ones of said Fe-Si-Al alloy thin films, characterized in that a reaction prevention film selected from the group consisting of MgO, MgO·$Al_2O_3$ and $MgTiO_3$ is formed in the interface between said non-magnetic oxide substrate and the adjacent one of said Fe-Si-Al alloy thin films and also in the interface between each of said Fe-Si-Al alloy thin films and each of said non-magnetic insulating films.

2. The thin film magnetic head according to claim 1, wherein said non-magnetic insulating film comprises $SiO_2$.

3. The thin film magnetic head according to claim 2, wherein said reaction prevention films each have a thickness of 10 to 5,000 Å.

4. The thin film magnetic head according to claim 1, wherein said reaction prevention films each have a thickness of 10 to 5,000 Å.

5. The thin film magnetic head according to claim 4, wherein said reaction prevention films each have a thickness of 50 to 1,000 Å.

\* \* \* \* \*